(12) United States Patent
Hellwig et al.

(10) Patent No.: US 6,931,020 B1
(45) Date of Patent: Aug. 16, 2005

(54) METHOD AND DEVICE FOR SWITCHING A PLURALITY OF PACKET-ORIENTED SIGNALS

(75) Inventors: Mathias Hellwig, Buchloe (DE); Andreas Kirstädter, Ebersberg (DE)

(73) Assignee: Infineon Technologies AG, Munich (DE)

( * ) Notice: Subject to any disclaimer, the term of this patent is extended or adjusted under 35 U.S.C. 154(b) by 651 days.

(21) Appl. No.: 09/627,179

(22) Filed: Jul. 27, 2000

(30) Foreign Application Priority Data

Jul. 27, 1999 (DE) ........................................ 199 35 126

(51) Int. Cl.$^7$ ............................................ H04L 12/403
(52) U.S. Cl. ........................ 370/414; 370/412; 370/413
(58) Field of Search ................................ 370/389, 392, 370/396, 398, 395.71, 394, 412, 413, 414, 418, 422

(56) References Cited

U.S. PATENT DOCUMENTS

| | | | | |
|---|---|---|---|---|
| 5,184,346 A | * | 2/1993 | Kozaki et al. ............ | 370/395.7 |
| 5,361,255 A | * | 11/1994 | Diaz et al. ................. | 370/374 |
| 5,367,520 A | * | 11/1994 | Cordell ................... | 370/395.71 |
| 5,825,751 A | * | 10/1998 | Papierniak et al. ......... | 370/248 |
| 6,134,246 A | * | 10/2000 | Cai et al. ..................... | 370/474 |

\* cited by examiner

Primary Examiner—Bob Phunkulh
Assistant Examiner—Joshua Kading
(74) Attorney, Agent, or Firm—Laurence A. Greenberg; Werner H. Stemer; Gregory L. Mayback

(57) ABSTRACT

A method for switching a plurality of packet-oriented signals and an apparatus for performing the method includes supplying a signal to port units, each having ports, at one port, some ports, or all ports. A signal is connected from one port to another port of another unit by a central switching unit. Signal transmission therebetween is performed by transmission of data blocks. Each port unit ascertains the address information item for each packet supplied and uses the item to determine the appropriate receiving port unit. Each port unit stores the data packet in a buffer memory, compiles availability information and transmits it to the switching unit, which evaluates availability and ascertains further transmission without blocking occurring. The switching unit connects the necessary paths between the transmitting and receiving port units and transmits the packets/cells through the paths. The receiving port units evaluate the information and assign the packets/cells, if necessary recombining the cells into data packets and outputting through ports.

18 Claims, 4 Drawing Sheets

METHOD AND DEVICE FOR SWITCHING A PLURALITY OF PACKET-ORIENTED SIGNALS

BACKGROUND OF THE INVENTION

Field of the Invention

The invention relates to a method and to an apparatus for switching a plurality of packet-oriented signals, in particular for switching and routing in local area networks based on the Ethernet standard.

In recent years, there has been a great increase in the transmission capacity or the data transmission rate in networks. This has led to the need to develop switching devices, in particular switches and routers, having a data throughput in the multi-gigabit or even terabit range. At such high transmission speeds, the necessary network protocols can now only be produced as hardware.

One option is for switching devices for these high transmission speeds to be produced as an active backplane using a crossbar architecture. Crossbar switching architectures operate entirely in parallel, so that the throughput of such devices is limited only by the number of individual ports and the communication protocol used internally.

Crossbar architectures usually operate with a plurality of port chips connected to a central crossbar chip by means of interfaces. Known crossbar chips usually contain buffer memories for temporarily storing packets or cells when collisions occur. The cells are produced by segmenting a packet into cells of a particular length (which is a customary procedure—particularly with packets of variable length) which are then processed further within the switching device. This makes it possible to process the cells rationally in sync with the clock. In addition, when collisions occur, i.e. when a plurality of ports on the port chips attempt to transmit to the same port on another port chip, "fair" transmission of the signals or packets present on the competing ports is simplified. To this end, a number of known devices have an external contention resolution unit (cell conflict resolution unit) connected to the crossbar chip, said contention resolution unit using particular algorithms to ascertain a fair selection of the competing ports.

In addition, crossbar architectures or crossbar chips are also known in which internal buffering of the packets or cells and a contention resolution unit are dispensed with completely, the loss of packets or cells in the event of a collision is accepted in such structures, however.

In the known architectures, as already mentioned, the data packets supplied to the ports are usually segmented. The individual cells are then stored in a buffer memory, which is necessary anyway in order to be able to cushion spikes in the transmission rate in systems with a variable data transmission rate—for example systems in which different services are transmitted on the same lines.

A disadvantage of these known systems is the relatively high level of production complexity, because virtually all the protocol mechanisms need to be produced as hardware on account of the high transmission speed. In particular, the provision of buffer memories and associated high speed transmission paths for the internal transmission of data from and to the buffer memories makes up a considerable part of the overall complexity for producing such switching devices. In addition, double buffering results in an undesirably high delay time for the switched signals. In the event of the buffer overflowing, cell losses may additionally arise.

Finally, producing the communication between an external contention resolution unit, present in some known devices, and a central switching unit results in considerable outlay.

SUMMARY OF THE INVENTION

On the basis of this prior art, the invention is based on the object of providing a method and an apparatus for switching a plurality of packet-oriented signals, where the highest possible data throughput with the lowest possible delay time and simultaneous freedom from blocking can be ensured simply and with little outlay, and good scalability is achieved for a system comprising a plurality of components.

The invention achieves its objectives with a method for switching a plurality of packet-oriented signals, in particular for switching and routing in local area networks based on the Ethernet standard. In the method, a respective signal can be supplied to plurality of port units, which each have a predetermined number of ports, at one port, a plurality of ports or all the ports, and in which a signal is connected from a port on a port unit to a port on another port unit by a central switching unit coupled to the port units, with signal transmission between the port units and the central switching unit, and vice versa, being carried out in steps by the transmission of data blocks. Each port unit ascertains the address information item for each data packet supplied to one of its ports and uses this address information item to determine the port unit to which the packet needs to be transmitted. Each port unit stores the data packet as a whole, or segmented into a plurality of cells, in a buffer memory associated with said port unit. Each port unit compiles, at predetermined intervals of time, availability information that indicates to which of the other port units at least one data packet or cell needs to be transmitted. The port units transmit this availability information to the central switching unit. The central switching unit evaluates the availability information and uses a prescribed specification to ascertain authorization information which indicates from which port units (transmitting port units) a respective data packet or cell can be transmitted to which other port unit (receiving port units) in the next step or in a particular one of the next steps without blocks occurring. The central switching unit transmits the authorization information at least to the relevant transmitting port units. The transmitting port units transmit the particular released data packets or cells to the central switching unit. The central switching unit connects the necessary paths between the transmitting port units and the receiving port units and transmits the data packets or cells to the respective receiving port units through the connected paths. The receiving port units evaluate the address information in the received data packets or cells and assign the data packets or cells to the relevant ports, if necessary recombing the cells received in a plurality of steps into data packets and outputting the data packets via the relevant ports.

The invention also includes an apparatus for carrying out the method having a plurality of port units connected to a central switching unit. The port units and the central switching unit each have a control unit designed for carrying out the steps of the method.

The invention is based on the knowledge that, using the inherently known design, which is advantageous in terms of good scalability, of a switching device for packet-oriented signals in which a plurality of port units which each have a particular number of ports are coupled to a central switching unit, a high data throughput and (internal) freedom from blocking can be achieved, with simultaneously low production complexity, by simultaneously using the buffer memories, which are required anyway in the port units, for intermediate buffering in connection with the production of a contention resolution function.

According to the invention, the way in which the contention resolution function is produced is that the port units transmit availability information to the central switching unit, the availability information indicating to which of the other port units at least one data packet or cell needs to be transmitted. The central switching unit evaluates the availability information and uses a prescribed specification (contention resolution algorithm) to ascertain authorization information indicating from which port units (transmitting port units) a respective data packet or cell can be transmitted to which other port units (receiving port units) in the next step or in a particular one of the next steps without blocking occurring.

The central switching unit transmits the authorization information at least to the relevant transmitting port units which have been ascertained as having transmission authorization to a particular other port unit, and connects the necessary paths between the transmitting port units and the receiving port units. In this context, the paths can be connected either directly by evaluation of the permissible transmission authorizations ascertained by the contention resolution unit, or by evaluation of address information in the transmitted data packets or cells.

The transmitting port units transmit the particular released data packets or cells to the central switching unit, and the central switching unit transmits these to the respective receiving port units via the connected paths.

The receiving port units evaluate the address information in the received data packets or cells and assign the data packets or cells to the relevant ports. If necessary, the receiving port units recombine the cells received in a plurality of steps into data packets and output the data packets to the respective addressee via the relevant ports.

By comparison with known structures, the advantage arises that the central switching unit, which can be in the form of a crossbar chip, does not have to be provided with dedicated buffer memories. This greatly reduces the surface area required for the chip. In addition, there is no need for chip-internal high speed lines for transmitting data from and to the buffer memories and for addressing the buffer memories. Furthermore, there is no need for measures to prevent such buffer memories from overflowing.

To achieve the highest possible (internal) transmission speed within the switching apparatus according to the invention and to minimize the protocol complexity, the availability and authorization information and the data packets or cells are transmitted synchronously at predetermined intervals of time.

On the basis of the preferred embodiment of the method according to the invention, the availability information is provided in the header of a packet or cell being transmitted from a transmitting port unit to the central switching unit. This results in no kind of additional protocol complexity for transmitting the availability information.

Preferably, the availability information comprises a number of bits which correspond to the actual or maximum possible number of port units which are connected or can be connected to the central switching unit, the position of a bit within the number of bits indicating the port unit to which a packet or cell is available for transmission, and one binary state of the bits signifying the presence of a data packet to be transmitted or of a cell to be transmitted, and the other binary state signifying the absence. This results in the advantage of an only minimally larger data packet or an only minimally larger cell.

Similarly, the authorization information can be accommodated in the header of a packet or cell being transmitted from the central switching unit to the relevant port units.

By way of example, the authorization information can comprise a number of bits containing a coded designation for that port unit to which transmission of a data packet or cell is enabled from that port unit to which this authorization information is transmitted.

In order to permit a data packet or cell transmitted to the central switching unit to be assigned to a port on a receiving port unit, in the preferred embodiment of the method according to the invention, the port unit and the port on the port unit are indicated in the header of a packet or cell.

In a manner which is known per se, the apparatus for carrying out the method according to the invention comprises a plurality of port units which each have a plurality of ports in turn and are connected to a central switching unit. The port units and the central switching unit each have a control unit designed to carry out the method steps explained above.

According to the invention, the central switching unit can have a collision resolution unit which uses a prescribed specification to create the fairest possible authorization information for the case in which a plurality of port units at the same time contain at least one data packet or cell available for transmission to the same other port unit.

According to the preferred embodiment of the invention, the collision resolution unit is designed so as to be integrated with the central switching unit. This results in the advantage of a very simple modular design for a corresponding switching apparatus. In addition, the integration of the collision resolution unit ensures the high speed demanded, since only short paths for transmitting the availability information to this unit and the authorization information from this unit need to be accepted.

On the basis of one embodiment of the apparatus according to the invention, the control units for the port units each have an interface unit for coupling the port units to the central switching unit, and a protocol unit for carrying out the control tasks internal to the port unit.

The protocol units preferably transmit to the interface units the respective information item regarding whether no data packets or cells, a single data packet or cell or at least two data packets or cells are available for transmission for the other port units. In this way, once authorization information has been received for one of the ports, the interface unit can use this information to ascertain the availability information for the next step or for a particular one of the next steps without further communication with the protocol unit.

Preferably, the interface unit transmits the next availability information, ascertained after receipt of authorization information, to the central switching unit immediately with the next data packet or the next cell.

Further embodiments of the invention can be found in the dependent claims.

BRIEF DESCRIPTION OF THE DRAWINGS

The invention is explained in more detail below with the aid of an illustrative embodiment shown in the drawing, in which.

DESCRIPTION OF THE PREFERRED EMBODIMENTS

Figure 1:
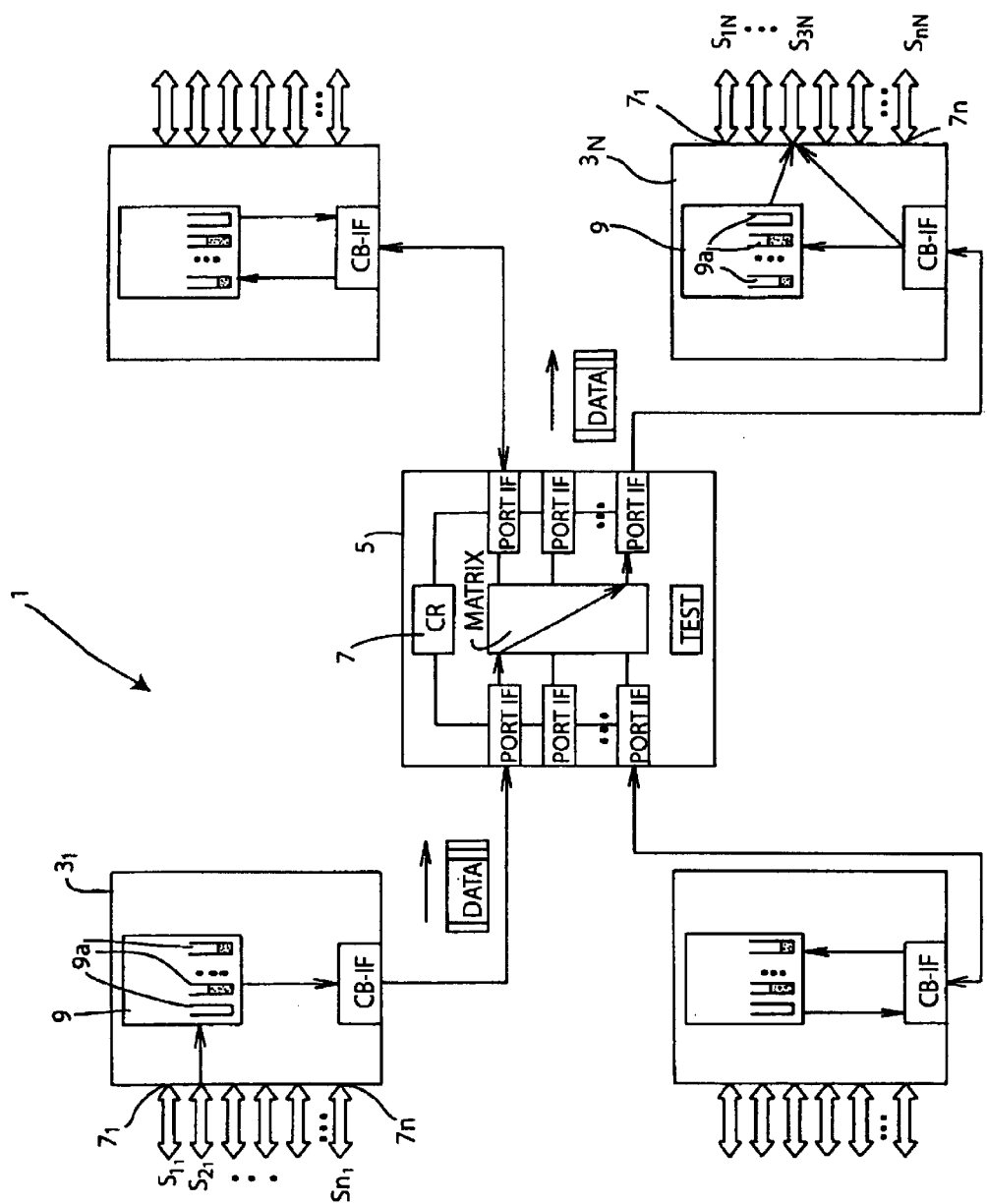
FIG. 1 shows the schematic architecture of a switching apparatus according to the invention and at the same time schematically shows the flow of data.
Figure 2:
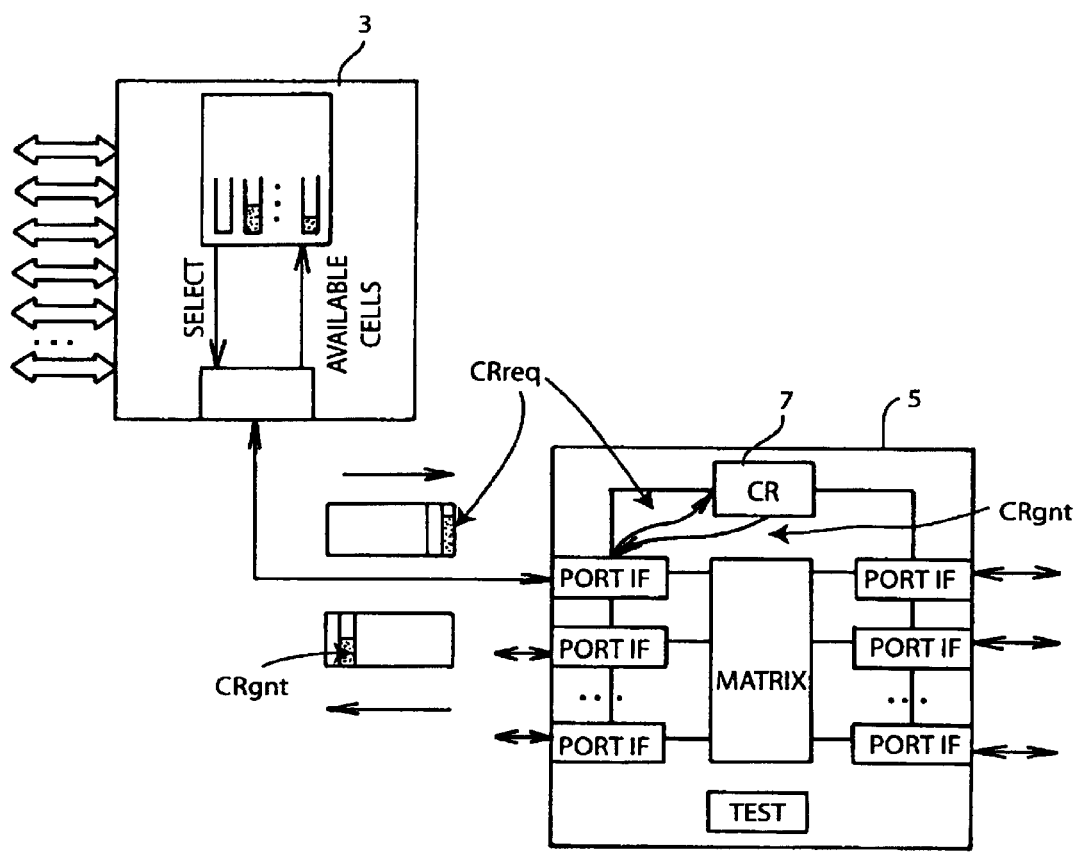
FIG. 2 shows the schematic illustration of the central switching unit and of a port unit in FIG. 1 and at the same time shows the flow of information for collision resolution.

FIG. 1 is a schematic illustration of the architecture of a switching apparatus 1 according to the invention which comprises a total of N port units $3_1$ to $3^N$ and a central switching unit 5. Each of the N port units $31$ to $3^N$ has n ports $7_1$ to $7_n$ to which a signal $S_{ij}$ can be supplied in each case, where: 1=i=n and 1=j=N. The port units are usually designed such that two-way communication is possible on each port.

However, the principle of the present invention can naturally also be applied to systems in which particular ports or all the ports are designed merely for one-way communication. In practice, however, this will probably be a rare case.

The port units 3 shown in FIG. 1 are preferably in the form of integrated port modules or separate units. The same applies to the central switching unit 5. This produces a modular design which again permits simple scaling, i.e. matching of the switching apparatus to the particular number of switchable data lines required.

Figure 4:
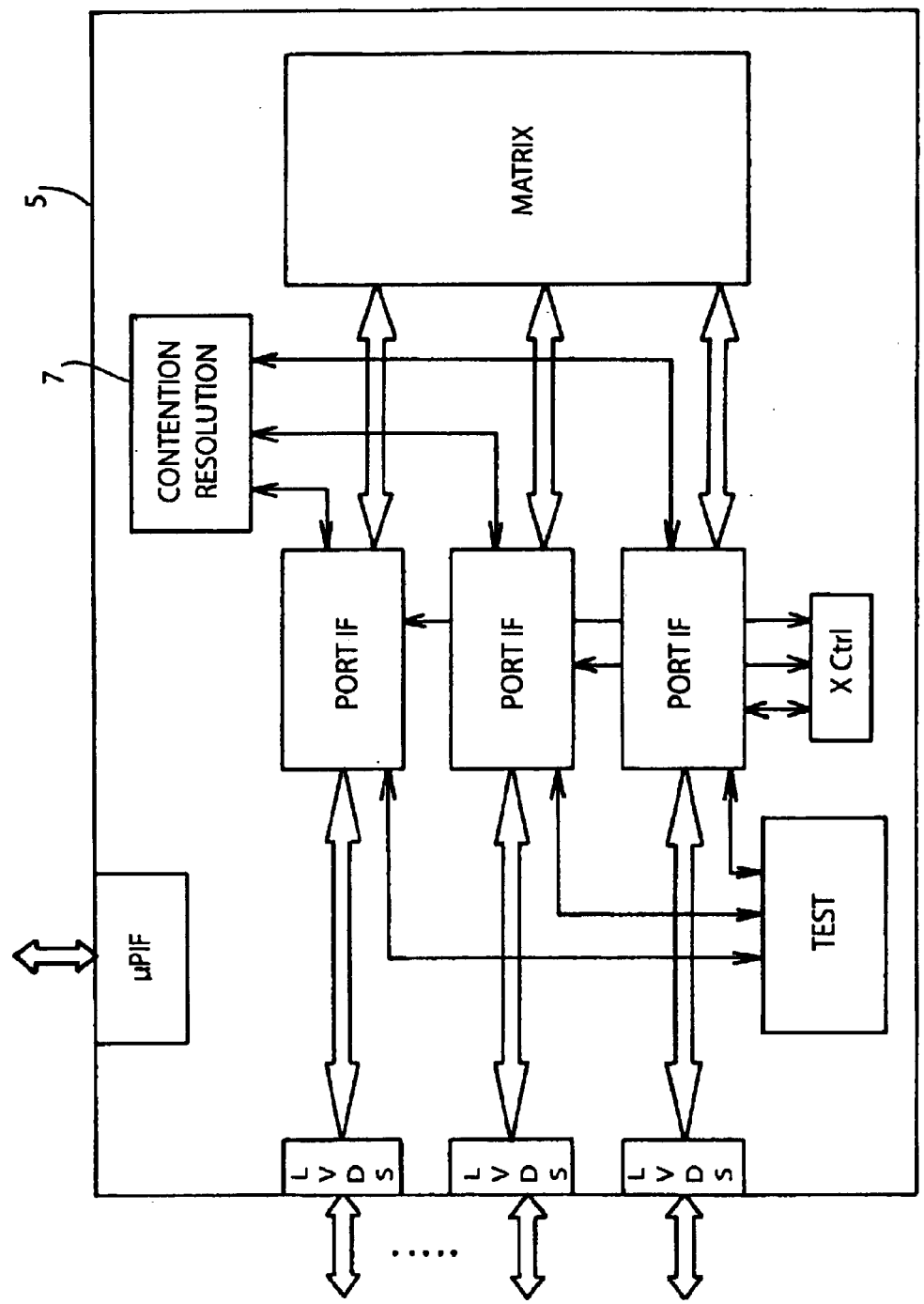
FIG. 4 is a block circuit diagram of a switching unit according to the invention.

As shown in FIG. 1, the port units 3 and the central switching unit 5 are connected by means of interface units. In this arrangement, the interface units provided in the port units 3 are denoted by "CB-IF" (crossbar interface) and the interface units provided in the central switching unit 5 are denoted by "Port IF" (port interface). In this case, the central switching unit 5 is provided with a separate interface unit Port IF for each port unit 3. Each interface unit Port IF and CB-IF can, as can be seen in FIG. 4 for the central switching unit, be connected to the transmission lines between the port units 3 and the central switching unit 5 via a low voltage differential signaling unit (LVDS). This makes it possible to reduce the number of connecting lines, and, by way of example, 16 bit wide data lines can be provided between the interface units Port IF and CB-IF, respectively, and the LVDS units, and 4 bit wide data lines (in each case differential signals on a total of 8 physical lines) can be provided between the LVDS units.

The central switching unit 5 assumes the function of a crossbar switch, so that internal data transmission of a maximum of N (crossbar internal) signals is possible entirely in parallel over time (when performing full duplex transmission using LVDS units). The data inputs/outputs of the interface units Port IF are connected to the actual switching matrix (Matrix). Furthermore, a Port IF can connect the switching matrix in the manner conveyed to the latter, so that the desired path from a Port IF to another Port IF within the central switching unit is available for data transmission. To prevent a plurality of ports 7 on different port units 3 from accessing a port 7 on another port unit at the same—time this would mean a cell loss or internal blocking—, a collision resolution unit 8 is provided, also called contention resolution unit (CR) below. The CR unit 8 is preferably provided inside the central switching unit and, together with the latter, is in the form of an integrated circuit. Since the CR unit 8 needs to interchange data between it and the interface units Port IF very quickly, as revealed in the description below, the integration of the CR unit results in the advantage of very short, high speed transmission lines.

The following text is a more detailed explanation of the method according to the invention and the operation of the switching apparatus according to the invention with the aid of the figures:

As shown in the illustration in FIG. 1, a respective signal. $S_{ij}$ is supplied to the ports $7_1$ to $7_n$ on the port units $3_1$ to $3^N$. Each of the signals is a stream of data packets which can have a different length.

The data packets of the individual signals $S_{ij}$ are first segmented by the port units 3, i.e. they are split into individual cells of constant length. The cells are stored in a buffer memory 9 which can be integrated in the port units 3 or may be in the form of an external memory. Segmenting is carried out by a control unit (not shown in more detail) which is provided in each port unit 3 and organizes the buffer memory 9 in such a way that a separate virtual buffer memory (9a) is produced for each of the other port units 3, said buffer memory (9a) containing the cells which are to be transmitted to the other port unit concerned. For this purpose, each port unit 3 or its control unit evaluates the address information item in each packet received and uses this information item to establish whether or not the packet or the corresponding cells need to be transmitted to another port unit 3, and assigns the appropriate cells to the respective virtual (9a) memory. The mutual assignment of the cells of a data packet can be maintained by providing pointers. A respective separate memory can naturally also be provided for each of the other port units.

The separate or virtual memories (9a) are, according to type, FIFO memories, since the sequence of the cells needs to be retained when they are read in and out.

If the port unit establishes that no transmission to another port unit is necessary, then the port unit undertakes the switching process internal to the port unit. Of course, the data packets will generally also need to be buffered for this purpose, but will not necessarily need to be segmented. Since this internal switching function of the port unit in the switching apparatus 1 is not relevant to the present invention, there is no need for any more detailed explanation.

Such a buffer memory 9 per port unit 3 is necessary in every case, because only one cell can be transmitted internally from a port unit to the central switching unit at a time. In addition, when the signals $S_{ij}$ are transmitted asynchronously, buffering is necessary in order to cushion transmission spikes. This is the case in ATM systems, for example, since different services operate at different data transmission rates.

In principle, it is also possible to dispense with segmenting the packets for internal transmission, and the data packets can be transmitted whole within the switching apparatus 1. However, segmenting results in the advantage that transmission can take place within the switching apparatus in sync with the clock, irrespective of the particular length of the packets. In addition, fair handling of the individual (outputs of the) port units is simplified.

The cells are transmitted within the switching apparatus 1 in sync with the clock, i.e. one or more cells are in each case transmitted from the port units 3 to the central switching unit 5, and vice versa, in one time slot. With an internal transmission speed of 2 Gbit/s (on each connection between the port units and the central switching unit and within the central switching unit) and a cell length or size of 70 bits, a time slot can have a duration of 280 ns, for example.

In order to prevent blocking within the switching apparatus, each port unit 3 first transmits availability information to the central switching unit 5. The availability information indicates the other port units for which the respective port unit currently contains cells for transmission. As expressed in the model indicated above for the virtual separate buffer memories (9a) which the port units contain for the other port units, the availability information thus indicates whether the individual virtual buffer memories each contain no cells or at least one cell.

Figure 3:
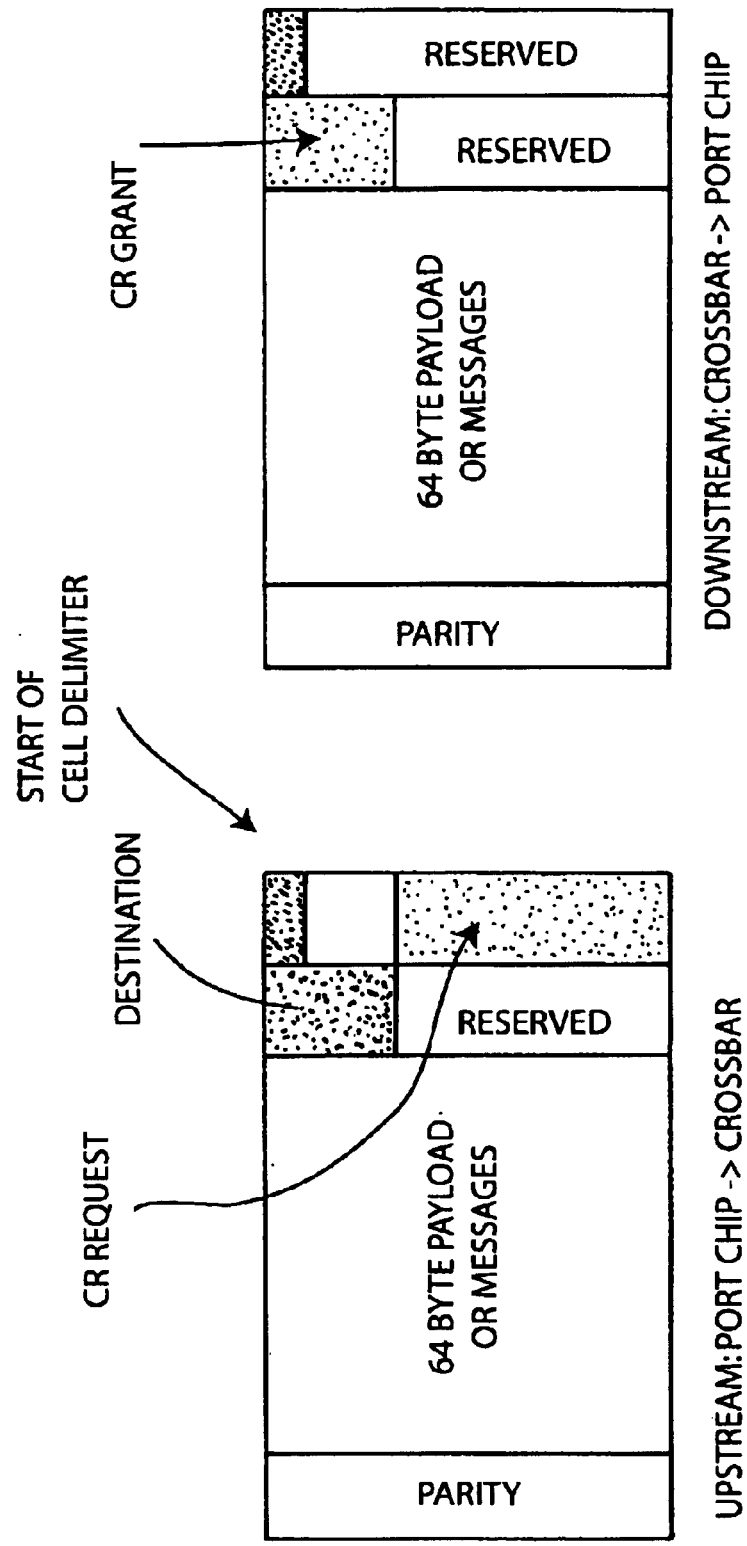
FIGS. 3a and 3b show the schematic structure of the data blocks transmitted from the port units to the central switching unit (FIG. 3a) and from the central switching unit to the port units (FIG. 3b)

As shown in FIG. 3a, the availability information can be transmitted in the header of the cells transmitted from the port units 3 to the central switching unit 5 in each case, in order to avoid a separate transmission step and the associated higher protocol complexity.

In this context, the availability information can be combined in the form of a contention request vector (CRreq), the vector comprising N bits according to the number of port units. The position of each bit within the CRreq vector indicates the number j (1=j=N) of the port unit $3^j$, and the use of the relevant bit indicates whether the respective port unit contains a cell available for transmission for the port unit $3^j$.

It is not essential for the CRreq vector to be linked to the cell which is actually to be transmitted in the next time slot, but rather one or more time slots can be directed into the future. That is to say the respective availability information item refers to cells possibly not being transmitted until two or more time slots in the future.

Once the cells, of which there may possibly be a plurality, simultaneously transmitted by the port units have been received, the central switching unit 5 or the interface units Port IF read out the availability information contained in each of these cells and transmit it to the CR unit 8, together with the information item about which port unit has transmitted the availability information. The CR unit 8 uses a prescribed contention resolution algorithm to ascertain a respective possible combination of permissible, i.e. collision free, transmission options from appropriate transmitting port units to appropriate receiving port units.

The combination ascertained in this way is transmitted in the form of authorization information item CRgnt at least to those port units 3 which are intended to receive transmission authorization for the relevant time slot.

As can be seen from FIG. 3b, this authorization information is preferably again transmitted in the header of cells. By way of example, the respective interface unit Port IF can write the coded chip ID of the port unit to which transmission from the port unit connected to the respective interface unit Port IF has been enabled into the header of a cell which is to be transmitted if the port unit connected to the respective Port IF is to be granted transmission authorization (for the relevant cell) for the relevant time slot. If the relevant port unit is not to be granted authorization, then that region of the header which is reserved for the authorization information item can contain a defined assignment which is interpreted by the port units as "no authorization granted".

After receipt of a cell, the central switching unit 5 or the interface units Port IF read out not just the availability vector CRreq, but also at least that address information (denoted by "destination" in FIG. 3a) which is required to ascertain the port unit to which the relevant cell is to be transmitted.

Instead of such address evaluation, each interface unit Port IF can also use the authorization information supplied to it by the CR unit to connect the switching matrix in the relevant time slot such that the respective cell is transmitted to the correct port unit in the very same time slot.

Since the header of the cells being transmitted from the central switching unit 5 to the respective port units 3 does not need to contain a CRreq vector, this space in the header can be used to transmit other information, for example for state information for the port units 3.

After receipt of a cell, the authorization information CRgnt is read out in the port units 3 and it is established whether the relevant time slot has been granted authorization (on the basis of the availability information transmitted to the central switching unit 5 previously).

The port unit or the corresponding control unit, which, after receipt of a cell, establishes that an authorization information item is present, makes the relevant cell, for which an availability information item has previously been transmitted to the central switching unit, available for transmission in the relevant time slot. To this end, the relevant cell is read out of the memory 9 and is transferred to the interface unit CB-IF.

Once a port unit 3 has received a cell, the control unit in the port unit reads the address information item in the header of the cell and assigns the cell to the respective output port or to the respective media access control (MAC) (not shown). In addition, the port unit or the respective MAC for the individual ports recomposes the individual cells to form the original data packets and transmits them to the respective addressees.

Once a cell has been received by the interface unit CB-IF in a port unit and the authorization information item has been read out and evaluated, a new availability information item needs to be ascertained immediately. The timing of this procedure is extremely critical.

In particular, it would take too long to read out the relevant cell, for which transmission authorization has been granted, from the memory first, then to establish the changed memory allocation and to report the presence of a cell in the virtual separate buffer memories (9a) to the interface unit CB-IF.

For this reason, the respective protocol unit (not shown, likewise part of the control unit in the port units) informs the interface unit whether no cells, a single cell or at least two cells are available for transmission to each of the other port units. In this way, after an authorization information item has been received for the respective port unit, the interface unit CB-IF can use this information to ascertain the next availability information without any further communication with the protocol unit, and hence without any time loss, and can transmit this availability information to the central switching unit immediately with the next cell to be transmitted.

We claim:

1. A method for switching a plurality of packet-oriented signals, which comprises:
 a) supplying a respective signal having data packets to at least one port of a plurality of port units, each of the port units having a predetermined number of ports;
 b) connecting the signal from a port on one of said port units to another port on another one of said port units through a central switching unit coupled to the port units, and carrying out signal transmission between the port units and the central switching unit in steps by transmitting data blocks;
 c) ascertaining with each port unit an address information item for each data packet supplied to at least one port of each port unit and using the address information item to determine a receiving port unit to which the data packet will be transmitted, each port unit storing, in a buffer memory associated with the receiving port unit, the data packet as a whole or segmented into a plurality of cells;
 d) compiling with each port unit, at predetermined intervals of time, availability request information indicating to which of the other port units the at least one of cell and at least one data packet will be transmitted;

e) transmitting using the port units the availability request information to the central switching unit;

f) the central switching unit evaluating the availability request information and using a prescribed specification to ascertain authorization information indicating from which port units a respective data packet or cell can be transmitted to a different port unit in a next step or in a particular one of next steps without an occurrence of blocking;

g) transmitting the authorization information at least to the relevant transmitting port units using the central switching unit;

h) transmitting particular released data packets or cells using the transmitting port units to the central switching unit, and the central switching unit connecting necessary paths between the transmitting port units and the receiving port units and transmitting the data packets or cells to the respective receiving port units through the connected paths; and i) the receiving port units evaluating the address information in the received data packets or cells and assigning the data packets or cells to their respective ports, and, if necessary, recombining the cells received in a plurality of steps into data packets and outputting the data packets through the relevant ports.

2. The method according to claim 1, which comprises transmitting availability request and authorization information and the data packets or cells synchronously at predetermined intervals of time.

3. The method according to claim 1, which comprises providing the availability request information in a header of a packet or cell being transmitted by the relevant port unit to the central switching unit.

4. The method according to claim 3, wherein the availability request information is a number of bits corresponding to at least one of an actual and maximum possible number of port units at least to be connected to the central switching unit, a position of a bit within the number of bits indicating a port unit of said number of port units to which a packet or cell is available for transmission, and one binary state of the bit signifying the presence of a data packet or cell to be transmitted and the other binary state signifying the absence of a data packet or cell.

5. The method according to claim 1, which comprises providing the authorization information in a header of a packet or cell being transmitted from the central switching unit to the relevant port unit.

6. The method according to claim 5, wherein the authorization information is a number of bits containing a coded designation for a port unit to which transmission of a data packet or cell is enabled from another port unit to which the authorization information is transmitted.

7. The method according to claim 1, which comprises indicating with a header of a packet or cell a port unit and a port on the port unit to which the packet or cell will be transmitted.

8. A method for switching and routing a plurality of packet-oriented signals in local area networks based on Ethernet standards, which comprises:

a) supplying a respective signal having data packets to at least one port of a plurality of port units, each of the port units having a predetermined number of ports;

b) connecting the signal from a port on one of said port units to another port on another one of said port units through a central switching unit coupled to the port units, and carrying out signal transmission between the port units and the central switching unit in steps by transmitting data blocks;

c) ascertaining with each port unit an address information item for each data packet supplied to one of the at least one port of each port unit and using the address information item to determine a receiving port unit to which the data packet will be transmitted, each port unit storing, in a buffer memory associated with the receiving port unit, the data packet as a whole or segmented into a plurality of cells;

d) compiling with each port unit, at predetermined intervals of time, availability request information indicating to which of the other port units the at least one cell and at least one data packet will be transmitted;

e) transmitting using the port units the availability request information to the central switching unit;

f) the central switching unit evaluating the availability request information and using a prescribed specification to ascertain authorization information indicating from which port units a respective data packet or cell can be transmitted to a different port unit in a next step or in a particular one of next steps without an occurrence of blocking;

g) transmitting the authorization information at least to the relevant transmitting port units using the central switching unit;

h) transmitting particular released data packets or cells using the transmitting port units to the central switching unit, and the central switching unit connecting necessary paths between the transmitting port units and the receiving port units and transmitting the data packets or cells to the respective receiving port units through the connected paths; and i) the receiving port units evaluating the address information in the received data packets or cells and assigning the data packets or cells to their respective ports, and, if necessary, recombining the cells received in a plurality of steps into data packets and outputting the data packets through the relevant ports.

9. An apparatus for carrying out the method according to claim 1, comprising:

a central switching unit; and a plurality of port units connected to said central switching unit, each of said port units having a predetermined number of ports and a buffer memory;

said port units and said central switching unit each having a control unit, the control unit comprising:
  means for supplying a respective signal having data packets to at least one port of said port units;
  means for connecting the signal from a port on one of said port units to another port on another of said port units through said central switching unit;
  means for transmitting signals between said port units and said central switching unit in steps by transmitting data blocks;
  means for ascertaining with each port unit an address information item for each data packet supplied to at least one port of each of said port units;
  means for using the address information item to determine a receiving port unit to which the data packet will be transmitted, each port unit storing, in said buffer memory, the data packet as a whole or segmented into a plurality of cells;

means for compiling with each port unit, at predetermined intervals of time, availability request information indicating to which of other port units the at least one cell or at least one data packet will be transmitted;

means for transmitting the availability request information to the central switching unit using the port units;

means for evaluating the availability request information with the central switching unit and for using a prescribed specification to ascertain authorization information indicating from which of said port units a respective data packet or cell can be transmitted to a different port of said port units in a next step or in a particular one of next steps without an occurrence of blocking;

means for transmitting using the central switching unit the authorization information at least to relevant transmitting port units;

means for transmitting particular released data packets or cells to said central switching unit with the transmitting port units;

means for connecting necessary paths between said transmitting port units and said other receiving port units with said central switching unit;

means for transmitting the data packets or cells to respective other receiving port units through connected paths;

means for evaluating address information in the received data packets or cells with said receiving port units; and means for assigning the data packets or cells to relevant ports, and, if necessary, means for recombining the cells received in a plurality of steps into data packets and outputting the data packets through relevant ports.

10. The apparatus according to claim 9, wherein said central switching unit has a collision resolution unit for using a prescribed specification to create a fairest possible authorization information item during a condition in which a plurality of said port units at the same time contain at least one data packet or cell available for transmission to the same other one of said port units.

11. The apparatus according to claim 10, wherein said collision resolution unit is integrated in said central switching unit.

12. The apparatus according to claim 9, wherein each of said control units in said port units has an interface unit for coupling said port units to said central switching unit and a protocol unit for carrying out control tasks internal to a respective one of said port units.

13. The apparatus according to claim 12, wherein said protocol unit is configured to transmit to said interface unit a respective information item regarding whether one of a group consisting of no data packets or cells, a single data packet or cell, and at least two data packets or cells is available for transmission for others of said port units, so that, once an authorization information item has been received for a respective one of said port units, said interface unit can use the information to ascertain availability request information for a next step or a particular one of the next steps without further communication with said protocol unit.

14. The apparatus according to claim 12, wherein said interface unit is configured to transmit next availability request information, ascertained after receipt of the authorization information, to said central switching unit immediately with a next data packet or a next cell.

15. An apparatus for switching a plurality of packet-oriented signals, comprising:

a central switching unit; and port units connected to said central switching unit, said port units and said central switching unit each having a control unit to carry out the method according to claim 1.

16. The apparatus according to claim 15, wherein each of said control units in said port units has an interface unit for coupling said port units to said central switching unit and a protocol unit for carrying out control tasks internal to a respective one of said port units.

17. The apparatus according to claim 16, wherein said protocol unit is configured to transmit to said interface unit a respective information item regarding whether one of a group consisting of no data packets or cells, a single data packet or cell, and at least two data packets or cells are available for transmission for others of said port units, so that, once an authorization information item has been received for a respective one of said port units, said interface unit can use the information to ascertain availability request information for a next step or a particular one of the next steps without further communication with said protocol unit.

18. The apparatus according to claim 16, wherein said interface unit is configured to transmit next availability request information, ascertained after receipt of the authorization information, to said central switching unit immediately with a next data packet or a next cell.

* * * * *